United States Patent
Caors et al.

(10) Patent No.: US 10,718,867 B2
(45) Date of Patent: Jul. 21, 2020

(54) OPTICAL SYSTEM AND METHOD FOR POINTING A LASER THROUGH THE ATMOSPHERE

(71) Applicant: THALES, Courbevoie (FR)

(72) Inventors: Antonin Caors, Guyancourt (FR); Bruno Bustin, Guyancourt (FR)

(73) Assignee: THALES, Courbevoie (FR)

(*) Notice: Subject to any disclaimer, the term of this patent is extended or adjusted under 35 U.S.C. 154(b) by 374 days.

(21) Appl. No.: 15/570,265

(22) PCT Filed: Apr. 20, 2016

(86) PCT No.: PCT/EP2016/058772
§ 371 (c)(1),
(2) Date: Oct. 27, 2017

(87) PCT Pub. No.: WO2016/173905
PCT Pub. Date: Nov. 3, 2016

(65) Prior Publication Data
US 2018/0120438 A1 May 3, 2018

(30) Foreign Application Priority Data

Apr. 30, 2015 (FR) ..................................... 15 00914

(51) Int. Cl.
*G01C 3/08* (2006.01)
*G01S 17/66* (2006.01)
(Continued)

(52) U.S. Cl.
CPC ................ *G01S 17/66* (2013.01); *F41G 5/08* (2013.01); *F41H 13/005* (2013.01); *G01S 3/7864* (2013.01)

(58) Field of Classification Search
CPC ........ F41H 13/005; F41G 5/08; G01S 3/7864; G01S 17/66
(Continued)

(56) References Cited

U.S. PATENT DOCUMENTS

| 2011/0103410 A1 | 5/2011 | Hutchin | |
| 2011/0203410 A1* | 8/2011 | Notani | F02N 11/0851 74/7 R |
| 2011/0253910 A1* | 10/2011 | Beck Keissary | F41G 3/04 250/492.1 |

FOREIGN PATENT DOCUMENTS

| WO | 2009/077360 A1 | 6/2009 |
| WO | 2009/077361 A1 | 6/2009 |
| WO | 2009/141299 A1 | 11/2009 |

\* cited by examiner

*Primary Examiner* — Mark Hellner
(74) *Attorney, Agent, or Firm* — Baker & Hostetler LLP

(57) ABSTRACT

An optical system for laser-pointing a target through the atmosphere, with four optical channels: a passive imaging channel with an auxiliary camera linked to a coarse pointing control device; an illumination channel with a pulsed illumination source and temporal synchronization means, these channels including a first common optical coarse pointing device; an effector channel with a high-power laser source; an active imaging channel with: a high-speed camera synchronized with the illumination source by the synchronization means, and linked to a fine pointing control device; means for harmonizing the high-speed camera with the high-power laser source; the active imaging and effector channels form a pair and include a second common optical coarse pointing device, the coarse pointing devices controlled by the coarse pointing control device; a common optical fine pointing device, controlled by the fine pointing control device; and the coarse pointing control device is linked to the fine pointing control device.

9 Claims, 3 Drawing Sheets

(51) Int. Cl.
*F41G 5/08* (2006.01)
*G01S 3/786* (2006.01)
*F41H 13/00* (2006.01)

(58) Field of Classification Search
USPC ..................................................... 356/4.01
See application file for complete search history.

OPTICAL SYSTEM AND METHOD FOR POINTING A LASER THROUGH THE ATMOSPHERE

CROSS-REFERENCE TO RELATED APPLICATIONS

This application is a National Stage of International patent application PCT/EP2016/058772, filed on Apr. 20, 2016, which claims priority to foreign French patent application No. FR 1500914, filed on Apr. 30, 2015, the disclosures of which are incorporated by reference in their entirety.

FIELD OF THE INVENTION

The field of the invention is that of systems for laser-pointing a target, provided with active imaging devices making it possible to locate targets in a given environment, the target potentially being aerial or terrestrial, and to feedback-control the laser pointing systems.

BACKGROUND

Generally, active imaging uses its own light source, conventionally a pulsed laser. By virtue of the directivity of the emission and the energies employed, a signal is received over a great distance, even through a scattering medium. These characteristics have in particular endowed this technology with substantial importance in security and defense. The photons emitted by a laser and reflected by various objects in a theater are collected by a receiver-imager. The joint use of a pulsed laser and a time window on reception allows a section of space containing the targets of interest to be selected.

The field of interest is in particular the pointing of directed laser energy systems requiring correction of effects due to atmospheric turbulence on the free propagation of laser beams; this turbulence interferes with the system and negatively affects performance in terms of accuracy and pointing stability. In addition, tracking a moving target and simultaneously correcting for optical interference introduced by the atmosphere requires substantial control bandwidths (of the order of 1 to 2 kHz) in order to correct for interference characteristically lasting for around 10 ms, and requires covering the widest possible spatial field (of the order of a half-space), while meeting operational constraints such as robustness, autonomy, mobility, deployment time, etc. For applications requiring very high levels of performance (accuracy of the order of microradians, range of several kilometers), this correction entails having access to a measurement of the position of the target with a high angular resolution and a sufficient frequency, in order to ensure the first level of compensation for the deformation of the wave surface (jitter phenomenon). Moreover, the illumination system must operate at a wavelength close, but different, to that of the laser pointing system.

Other examples of applications may be cited, for example the execution of optical communications in free space between a fixed ground station and a flying object in the air or in space, or else a long-distance welding method, which case is frequently encountered in shipyards for assembling large parts and for which the current solutions impose the use of welding stations in contact with or in close proximity to the parts to be assembled.

There currently exists a solution employed in telescopes for correcting for effects due to this atmospheric interference. The case of astronomical instruments has different operational characteristics, however. Specifically, the pointed object is generally point-like and fixed (or moving very slowly), which is generally not the case of the targets envisaged for laser pointing systems. Moreover, both day- and night-time operation is required.

Consequently, there still remains a need for a system for laser-pointing a target that simultaneously meets the aforementioned set of requirements, in terms of accuracy, range and pointing stability, addressable field, bulk and system cost.

SUMMARY OF THE INVENTION

The proposed solution is based on an opto-mechanical architecture in which pointing is divided into two stages, one termed the coarse stage and the other termed the fine stage, the first providing the angular coverage and the second imparting the final accuracy. Additionally, the coarse pointing stage allows active imaging to be employed which allows the fine pointing to operate.

More specifically, the subject of the invention is an optical system for laser-pointing a target through the atmosphere. It is primarily characterized in that it includes four optical channels:

a passive imaging channel with an auxiliary camera capable of obtaining images of the target, and a coarse pointing control device linked to this camera;

an illumination channel with a pulsed illumination source and temporal synchronization means, and in that the passive imaging and illumination channels include a first common optical coarse pointing device;

an effector channel with a high-power laser source;

an active imaging channel with:

a high-speed camera synchronized with the pulsed illumination source by the temporal synchronization means;

means for harmonizing the high-speed camera with the high-power laser source; and a fine pointing control device linked to this camera, and in that the active imaging and effector channels form a pair and include a second common optical coarse pointing device, the first and second optical coarse pointing devices being controlled by the coarse pointing control device or by the fine pointing control device depending on the operational phase in the firing sequence;

a common optical fine pointing device controlled by the fine pointing control device;

a convergent optical device provided with pointing means, and in that the coarse pointing control device is linked to the fine pointing control device.

The convergent optical device is preferably located between the common optical fine pointing device and the second optical coarse pointing device.

According to one feature of the invention, the optical pointing system comprises a first device for superposing the passive imaging and illumination channels that are located between the first optical coarse pointing device and the laser illumination source and a second device for superposing the active imaging and high-power channels that are located between the fine pointing device and the high-power laser source.

The optical pointing system optionally comprises other pairs of active imaging and effector channels that are arranged in parallel; the fine pointing control device of each active imaging channel is linked to the coarse pointing control device of the passive imaging channel.

According to another feature of the invention, the pairs of active imaging and effector channels are mounted on a structure in a predetermined, preferably rectilinear, configuration, and the structure is itself mounted on a device for rotating the structure.

The architecture of the system according to the invention makes it possible to employ as many high-power lasers as necessary to obtain the desired effect.

It also allows elements of small size to be used, which are easier to standardize and hence to obtain, thereby decreasing the cost of the solution and providing the system with a high degree of modularity, hence facilitated integration and maintenance.

Another subject of the invention is a method for tracking a target through the atmosphere by means of a pointing system such as described above, characterized in that it includes the following steps:

orienting the first and each second coarse pointing device in a predetermined direction;

when a target is present in the field of the auxiliary camera, locking and stabilizing a coarse tracking loop;

once a target has been located and is being tracked, control of the first coarse pointing device and of each second coarse pointing device is assumed by the coarse pointing control device;

activating the laser illumination source;

once the illumination has been activated, each high-speed camera delivers a video stream to the associated fine pointing control device in order to lock and stabilize each fine tracking loop;

each second coarse pointing device is then driven by the fine pointing control device of its pair, which subsequently drives both the coarse pointing device and the fine pointing device;

once each second coarse pointing device is slaved to the fine pointing control device of the pair under consideration, the coarse pointing control device subsequently controls only the first coarse pointing device;

under fire control of the system, activating the high-power lasers and tracking the target by virtue of the active imaging provided by the high-speed cameras and by the fine and coarse pointing devices so that each high-power laser source is pointed.

BRIEF DESCRIPTION OF THE DRAWINGS

Other features and advantages of the invention will become apparent on reading the detailed description which follows, given by way of non-limiting example and with reference to the appended drawings in which.

From one figure to another, the same elements bear the same references.

DETAILED DESCRIPTION

Figure 1:
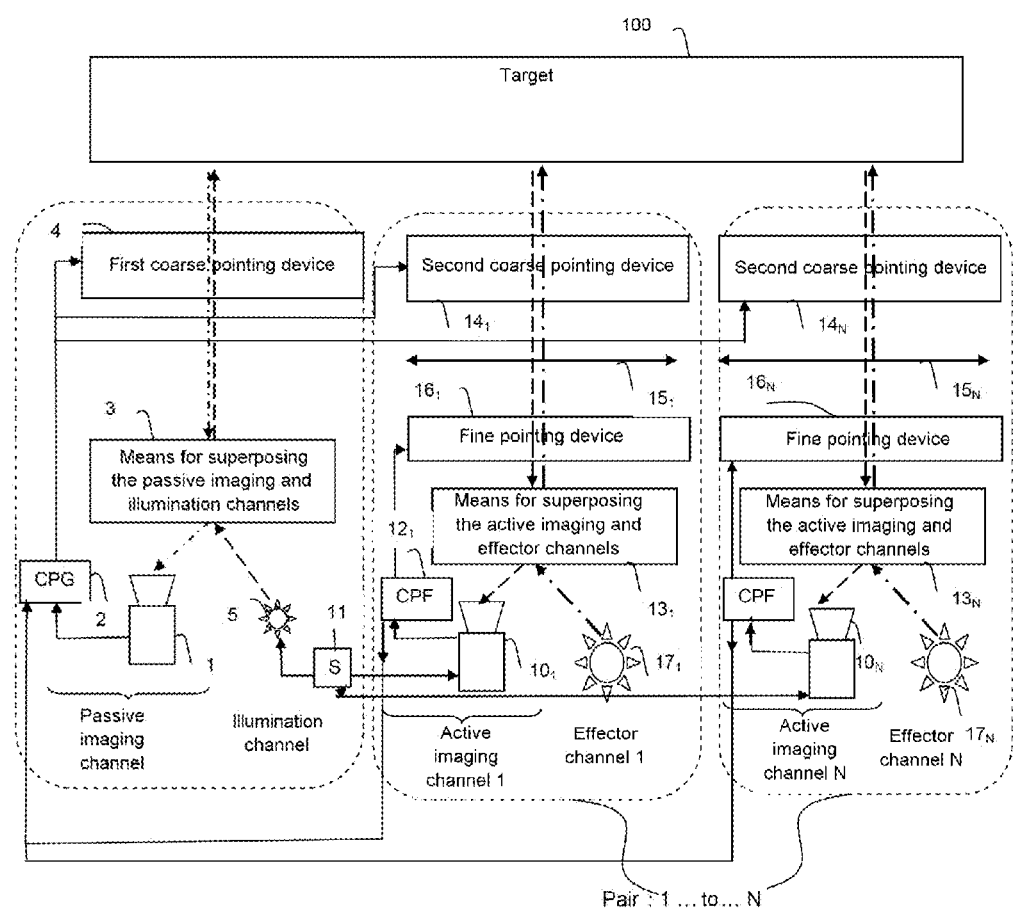
FIG. 1 schematically shows an example of a pointing system according to the invention, provided with multiple pairs of active imaging and effector channels.

With reference to FIG. 1, an example of an optical system for laser-pointing a target 100 through the atmosphere according to the invention is described. It includes four channels:

a passive imaging channel with a wide-field (for example around 3°) auxiliary camera 1 capable of obtaining images of the target 100, and a coarse pointing control device 2 linked to this camera, which device is provided with a deviation meter;

an illumination channel with a high-speed pulsed illumination source 5 operating in the near-infrared band (SWIR: 0.8 μm-3 μm), for example at a wavelength ensuring eye safety (1.5 μm), and having a field that is smaller than that of the wide-field camera (several milliradians for example), and temporal synchronization means 11 for synchronizing the high-speed camera $10_1$ (of the active imaging channel described below) with the illumination source 5.

These passive imaging and illumination channels include a first common optical coarse pointing device 4, which device is feedback-controlled according to setpoints generated by the deviation meter on the basis of the images arising from the auxiliary camera 1.

The two other channels are:

an effector channel with a high-power laser source $17_1$, also termed the high-power channel;

an active imaging channel with:

a camera $10_1$ synchronized with the illumination source 5 and having a field that is equal to that of the illumination source; specifically, an illumination that is much wider than the imaging field is inefficient, while an illumination that is much narrower than the imaging field does not provide sufficient uniformity;

means (not shown) for harmonizing the high-speed camera with the laser source; and a fine pointing control device $12_1$ linked to this camera $10_1$ and which is provided with a deviation meter; the coarse pointing control device 2 is linked to the fine pointing control device $12_1$.

These two active imaging and effector channels form a pair and include:

a second common optical coarse pointing device $14_1$, which device is also feedback-controlled according to setpoints generated by the deviation meter on the basis of the images arising from the auxiliary camera 1 then according to those of the high-speed camera $10_1$ as will be seen below; the first and second optical coarse pointing devices 4 and $14_1$ are identical and controlled by the coarse pointing control device 2;

a common fine pointing device $12_1$, which device is feedback-controlled according to setpoints generated by the deviation meter on the basis of the images arising from the high-speed camera $10_1$, which device is located between the second coarse pointing device $14_1$ and the high-power laser source, and controlled by the fine pointing control device $12_1$;

a convergent optical device $15_1$ provided with pointing means.

In order to correct for atmospheric interference, the bandwidth of which is equal to the Tyler frequency of the atmosphere, namely of the order of 100 Hz, the target performance in terms of fine pointing accuracy is of the order of microradians, and that in terms of tracking bandwidth is of the order of kilohertz. The following elements can typically be used to obtain these levels of performance.

The high-speed camera $10_1$ operates in the near-infrared band (SWIR) at a frame rate that is faster than one kilohertz, for example 2 kHz; its resolution is at least 256×256 pixels. The fine pointing control device $12_1$ and the fine pointing device $16_1$ operate at speeds matching that of the high-speed camera.

The illumination source 5 delivers a series of pulses, the fluence of which is generally higher than 10 mJ, and operates at the 1.5 μm wavelength for reasons of eye safety. It covers a field equal to that of the high-speed camera $10_1$, namely several mrad, for example 5 mrad. In order to optimize the signal-to-noise ratio of the high-speed camera, this beam is pulsed at a rate of repetition that is synchronized with the frame rate of the high-speed camera, by using, for example, a synchronization clock 11. This beam is typically pulsed at a rate of repetition that is an integer multiple of the frame rate of the high-speed camera (CHC).

For example, the illumination source 5 may include an illumination laser delivering energy of the order of 250 millijoules in pulses, the duration of which is of the order of 500 nanoseconds, and be associated with a high-speed camera having an open time window of the order of the pulse duration of the illumination source with a spectral filter width of about 10 nanometers. This illumination source+high-speed camera architecture represents a structure suitable for meeting the criteria of range and size of the objects to be treated.

Such an illumination source 5 is described in patent EP 2 283 548. It emits in a spectral domain in the vicinity of 1.5 μm in a spectral window of wavelength $\Delta\lambda=\pm 2$ nm and delivers an energy in pulses of 250 mJ at the rate of 2 kHz. This source is also coupled to an optical device (zoom) which adjusts the illuminated field to the target and to the illumination distance, the field of observation potentially varying from 1.5 mrad to 5 mrad.

The auxiliary camera 1 operates for example in the IR2 band (3 μm-5 μm).

The high-power laser $17_1$ operates at a power that may stretch from around one kilowatt to many tens of kilowatts in the near-infrared (1.07 μm for example).

The cameras 1, $10_1$, the illumination source 5 and the high-power source $17_1$ are preferably fixed.

The coarse pointing devices 4 and $14_1$ have at least two degrees of freedom; these are typically optical heads with mirrors that can be oriented, with one to four planar mirrors, two mirrors for a periscope or four mirrors for an optical gimbal.

The fine pointing device $16_1$ has at least two degrees of freedom; this is typically one or more mirrors placed on mounts provided with piezoelectric actuators or a glass strip placed on a mount provided with galvanometer actuators.

These coarse pointing devices 4 and $14_1$ may address a hemispheric field, namely a field of 360° in terms of azimuth and from −10° to +90° in terms of elevation, with or without restriction on the number of turns. Thus, regardless of the trajectory of an object above the horizon, this object may be pointed by the pointing system according to the invention.

The convergent optical device $15_1$ is provided with pointing means which cooperate with the second coarse pointing device $14_1$ and the fine pointing device $16_1$ in order to form the image of the target 100 on the high-speed camera $10_1$ and to point the high-power laser $17_1$ at the target 100. This means is, for example, a parabolic mirror mounted on a trio of linear actuators or a series of lenses mounted in a cam cylinder.

In order for the first optical coarse pointing device 4 to be common to the passive imaging and illumination channels, a first device 3 for superposing these two channels (common to these two channels) is added between the first coarse pointing device and the laser illumination source.

Similarly, in order for the second optical coarse pointing device $14_1$, the fine pointing device $16_1$ and the convergent device $15_1$ to be common to the active imaging and effector channels, a second device $13_1$ for superposing these two channels (common to these two channels) is added between the fine pointing device and the high-power laser source. It is advantageously located as close as possible to the high-speed camera $10_1$ and to the high-power source $17_1$.

These superposition means are typically:

a dichroic strip; or a diffraction grating used in reflection mode; or a holographic mirror such as employed in head-up displays; or a pierced mirror, such as described in patents WO2009077361A1 and WO2009077360A1. The latter device makes it possible to achieve the separation of the high-power laser and high-speed active imaging channels independently of wavelengths.

In order to provide the total power required by the system, while meeting cost, robustness and maintainability objectives, multiple high-power laser sources are advantageously used. The pairs of active imaging and effector channels are then multiplied, keeping only a single passive imaging channel and a single illumination channel as shown in FIG. 1, in which from 1 to N pairs of active imaging and effector channels are also shown, where N≥2.

All of the active imaging and effector channels include the same functional elements, but these elements may be produced in different ways (for example in terms of power, field, pointing device technology, etc.). All of the high-speed cameras $10_1$ to $10_N$ of the active imaging channels are synchronized with a single illumination source 5, that of the illumination channel.

Each high-power laser beam $17_1$ (to $17_N$) is pointed toward the target 100 by means of its own coarse pointing $14_1$ (to $14_N$), fine pointing $16_1$ (to $16_N$) and convergent $15_1$ (to $15_N$) devices.

Figure 2:
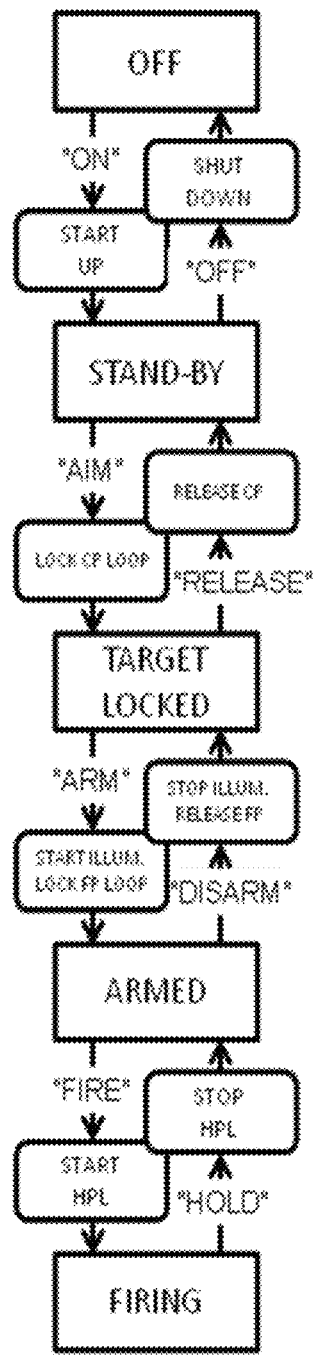
FIG. 2 shows a flowchart illustrating the steps of the operating method of the system, according to the invention.

A typical operating sequence is described below with reference to the flowchart of FIG. 2, taking as an example of a pointing system a system with multiple pairs of active imaging and effector channels. In this figure the states of the system are shown in sharp-cornered rectangles, the steps of the method in rounded rectangles, and commands are shown between quotation marks " . . . ".

In the initial OFF state, the optical laser pointing system is neither on nor supplied with power, all of the movable members such as the pointing devices are in storage configuration, and all of the control devices are disconnected.

The START-UP step consists in supplying power to the system, initiating certain start-up tests, placing the movable members in a "stand-by" configuration and initializing the control devices. It is triggered by the "ON" command of the system.

In the STAND-BY state, the system is in stand-by mode. From this state, an operator may carry out automated diagnostics, access the configuration mode of the system, or else continue with the operational sequence.

The LOCK CP (coarse pointing) LOOP state consists in orienting the coarse pointing devices 4, $14_1$ to $14_N$ in a predetermined direction, either by virtue of an external object designation (DO radar) or else by executing a search pattern, in particular by means of the deviation meter of the coarse control device 2, or else by manual pointing by the operator. Subsequent to this pre-pointing:

if a target is present in the field of the auxiliary camera 1 and is recognized, a coarse tracking loop (CP LOOP) is locked by the coarse pointing control device 2 and stabilized; the system transitions to TARGET LOCKED state;

if no target can be locked, the system returns to stand-by after a delay parameterized in the settings.

This step is triggered by the "AIM" command, or else by the total loss of locking from a later state.

In the TARGET LOCKED state, a target 100 has been located and the system has successfully locked on thereto. All of the coarse 4, $14_1$ (to $14_N$) and fine $16_1$ (to $16_N$) pointing devices are feedback-controlled according to the images arising from the auxiliary camera 1: all of the second coarse pointing devices $14_1$ (to $14_N$) are simultaneously pointed at the target 100 by the coarse pointing control device 2.

The START ILLUM/LOCK FP (fine pointing) LOOP step consists in activating the laser illumination source 5 and in locking each fine pointing loop. Once the illumination has been activated, the fine pointing device $16_1$ (to $16_N$) of each high power and active imaging channel pair is oriented in its accessible field until the target 100 is present in the field of the high-speed camera $10_1$ (to $10_N$) and is recognized; a fine tracking loop is then engaged by the fine pointing control device $12_1$ (to $12_N$) by means of its deviation meter and the high-speed camera $10_1$ (to $10_N$) that is synchronized with the illumination source 5.

In each high-power channel, the control of the second coarse pointing device $14_1$ (to $14_N$) is then assumed by the fine pointing control device $12_1$ (to $12_N$), which becomes the master of the coarse pointing control device 2. The latter then subsequently only generates the command for the coarse pointing devices on the basis of setpoints provided by fine pointing control, which drives both the coarse pointing and the fine pointing of their respective channels.

This step is triggered by the "ARM" command of the system or by the loss of fine tracking.

In the ARMED state, the target is tracked by virtue of the active imaging. As mentioned in the preceding step, each high-power channel is autonomous with respect to the control of its coarse pointing device $14_1$ (to $14_N$) and of its fine pointing device $16_1$ (to $16_N$). The passive imaging channel and hence the first coarse pointing device 4 remain under the control of the coarse pointing control device 2 in order to point the illuminator 5. In summary, in this state, the coarse pointing control device 2 receives pointing setpoints for each second coarse pointing device from the corresponding fine pointing control devices and generates appropriate commands for the corresponding coarse pointing devices; it also continues to receive the video stream arising from the passive auxiliary (wide-field) camera, and generates the command for the first coarse pointing device by virtue of its deviation meter. The coarse pointing control device is therefore still master with respect to the first coarse pointing device of the passive imaging and illumination channels, and slave with respect to the second coarse pointing devices of all of the other channels.

It is to this state that the system returns in the event of a safety breach during firing.

The START HPL (high-power laser) step consists in activating each high-power laser source $17_1$ (to $17_N$). It is triggered by the "FIRE" command of the system.

In the FIRING state, each high-power laser source is activated and pointed at the target 100 by virtue of the high-speed camera $10_1$ (to $10_N$), the fine $16_1$ (to $16_N$) and coarse $14_1$ (to $14_N$) pointing devices and the convergent device $15_1$ (to $15_N$) of its channel.

The STOP HPL step consists in disconnecting each high-power laser source $17_1$ (to $17_N$). It is triggered by the "HOLD" command of the system, by the timeout of a safety timer, or by the loss of the auxiliary channel, which simultaneously disconnect all of the power sources, or by an interruption in the safety system or by an interruption in the fine tracking, which may disconnect only the high-power channel in question and set off an alarm.

The system returns to the ARMED state as described above, in which the illumination source is activated and the pointing control of each pair 1 to N is carried out by its respective fine pointing control device $12_1$ (to $12_N$) and the pointing control of the pair 0 is carried out by the coarse pointing control device 2.

In the event of a safety breach during firing, the system returns to this ARMED state.

The STOP ILLUM./RELEASE FP step consists, in this order, in ceding control of the coarse pointing devices 4, $14_1$ (to $14_N$) to the coarse pointing control 2, disengaging the fine pointing loops and disconnecting the illuminator.

It is disarmed by the "DISARM" command of the system, and it then returns to the TARGET LOCKED state described above.

The RELEASE CP LOOP step consists in releasing the coarse tracking in order to return to the STAND-BY state. The coarse pointing devices 4, $14_1$ (to $14_N$) are placed in stand-by configuration.

This is triggered by the "RELEASE" command.

The SHUT DOWN step consists in disconnecting the power supply of the system, initiating certain disconnection tests and placing the movable members in a stowed configuration.

It is triggered by the "OFF" command of the system.

In order to ensure that the beams (in particular the high-power beams) are combined on the target, monitoring manages the geometry of the system with respect to its target in order to provide, to each channel, correction elements so that each channel aims at the same point on the target or so that, conversely, different pairs of active imaging and high-power channels aim at different points (different effects) on the same target.

Figure 3:
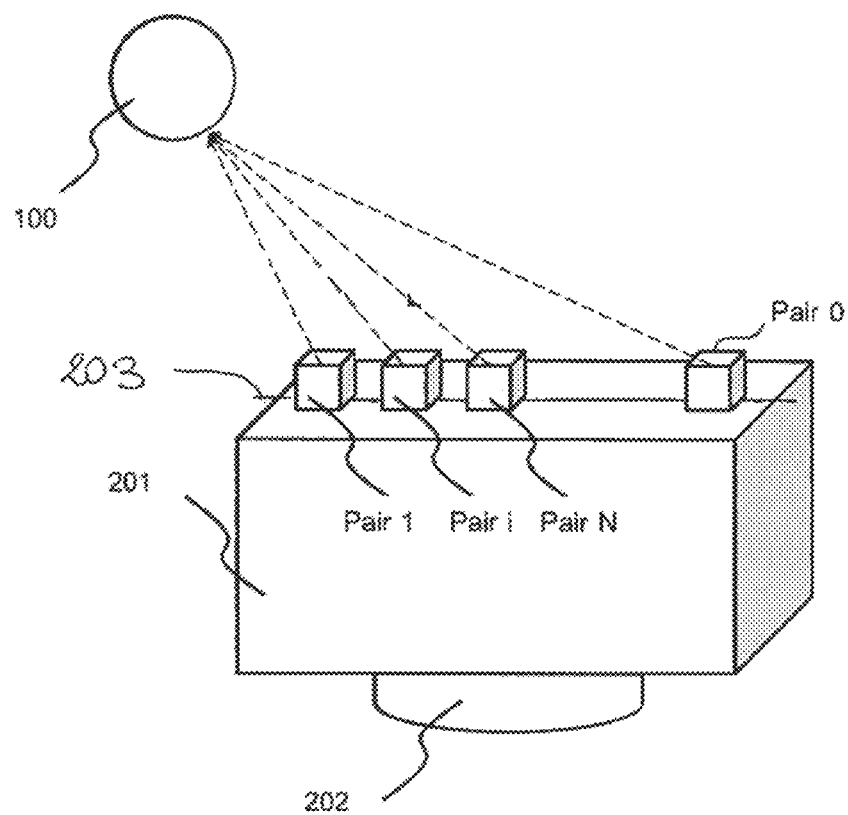
FIG. 3 schematically shows an example of a pointing system according to the invention, mounted on a rotary assembly.

In order to decrease potential masking between the various pointing devices, which masking becomes more significant as the number N of pairs of channels increases, the set of channels is incorporated in one and the same structure 201 shown in FIG. 3: this is typically a standard container, which has optionally been modified. It may be set in rotation about a vertical axis by means of a device 202 for rotating the structure about one or more of its axes, allowing for example a travel from −90° to +90° with respect to the neutral axis of the system. This rotary device 202 may be a turntable or a ball joint provided with actuators for the purpose of turning the structure. In addition, this assembly of channels is placed in a configuration minimizing masking risks considering the movement of the target 100 relative to the system: the pointing devices are advantageously positioned along the lengthwise median line 203 of the roof of the container. The turntable 202 and the pattern of installation of the pointing devices allow the system to be operated in any direction in the accessible hemisphere. Consequently, an operator may configure the system in such a position that masking will be avoided in the direction of interest (direction of the target).

Although the invention has been described in conjunction with particular embodiments, it is clearly evident that it is in no way limited thereto and that it comprises all of the technical equivalents of the described means, as well as combinations thereof if the latter fall within the scope of the invention.

The invention claimed is:

1. An optical system for laser-pointing a target through the atmosphere, comprising four optical channels:

a passive imaging channel with an auxiliary camera capable of obtaining images of the target, and a coarse pointing control device linked to this camera;

an illumination channel with a pulsed illumination source and temporal synchronization controller;

the passive imaging and illumination channels including a first common optical coarse pointing device linked to the coarse pointing control device;

an effector channel with a high-power laser source;

an active imaging channel with:
- a high-speed camera synchronized with the illumination source by the temporal synchronization controller;
- optical system for aligning the high-speed camera with the high-power laser source; and
- a fine pointing control device linked to this high-speed camera, and wherein the active imaging and effector channels form a pair and include a second common optical coarse pointing device, the first common optical coarse pointing devices linked to the coarse pointing control device;
- a common optical fine pointing device, controlled by the fine pointing control device; and
- a convergent optical device provided with pointing means, and wherein the coarse pointing control device is linked to the fine pointing control device.

2. The optical system for tracking a target as claimed in claim 1, wherein the convergent optical device is located between the common optical fine pointing device and the second optical coarse pointing device.

3. The optical system for tracking a target as claimed in claim 1, comprising a first device for superposing the passive imaging and illumination channels that are located between the first optical coarse pointing device and the laser illumination source.

4. The optical system for tracking a target as claimed in claim 1, comprising a second device for superposing the active imaging and high-power channels that are located between the fine pointing device and the high-power laser source.

5. The optical system for tracking a target as claimed in claim 1, comprising other pairs of active imaging and effector channels that are arranged in parallel and wherein the coarse pointing control device is linked to the fine pointing control device of each active imaging channel.

6. The optical system for tracking a target as claimed in claim 5, wherein the pairs of active imaging and effector channels are mounted on a structure in a predetermined configuration, and wherein the structure is itself mounted on a device for rotating the structure.

7. The optical system for tracking a target as claimed in claim 6, wherein the configuration is rectilinear.

8. A method for tracking a target through the atmosphere by means of a pointing system as claimed in claim 1, comprising the following steps:
- orienting the first and each second coarse pointing device in a predetermined direction;
- when a target is present in the field of the auxiliary camera, locking and stabilizing a coarse tracking loop;
- once a target has been located and is being tracked, control of the first coarse pointing device and of each second coarse pointing device is assumed by the coarse pointing control device;
- activating the laser illumination source;
- once the illumination has been activated, each high-speed camera delivers a video stream to the associated fine pointing control device allowing each fine tracking loop to be locked and stabilized;
- each second coarse pointing device is then driven by the fine pointing control device of its pair, which subsequently drives both the second coarse pointing device and the fine pointing device;
- once each second coarse pointing device is slaved to the fine pointing control device of the pair under consideration, the coarse pointing control device subsequently controls only the first coarse pointing device;
- under fire control of the system, activating the high-power lasers and tracking the target by virtue of the active imaging provided by the high-speed cameras and by the fine and coarse pointing devices so that each high-power laser source is pointed.

9. The method as claimed in claim 8, wherein the coarse pointing direction is determined by external object designation or by executing a search pattern, or by manual pointing by the operator.

* * * * *